Oct. 27, 1925.
E. W. MILLER
1,558,704
CUTTER FOR GENERATING THREADS AND THE LIKE
Filed March 31, 1923   2 Sheets-Sheet 1
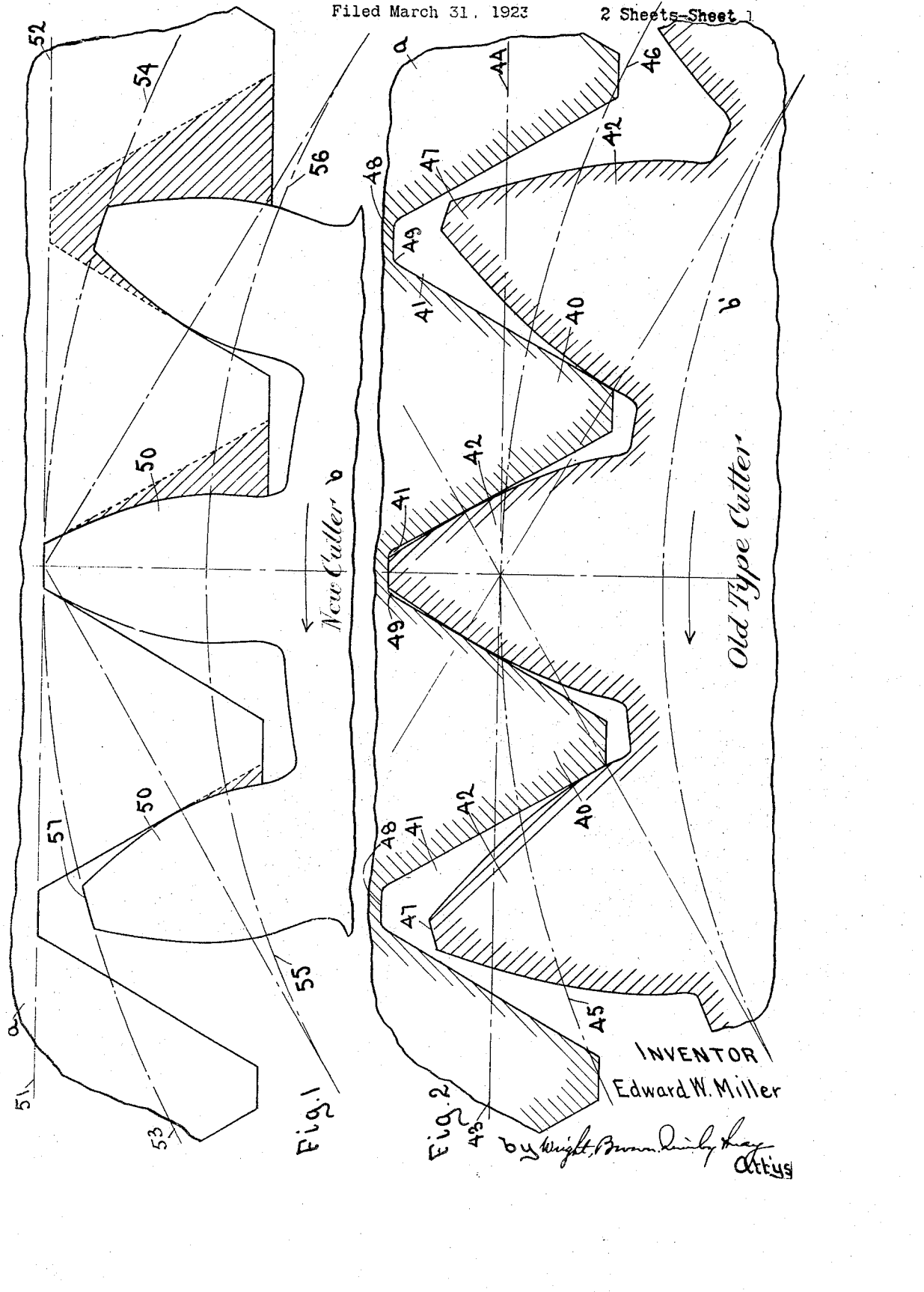
INVENTOR
Edward W. Miller Oct. 27, 1925.                                                              1,558,704
                                    E. W. MILLER
                       CUTTER FOR GENERATING THREADS AND THE LIKE
                              Filed March 31, 1923          2 Sheets-Sheet 2
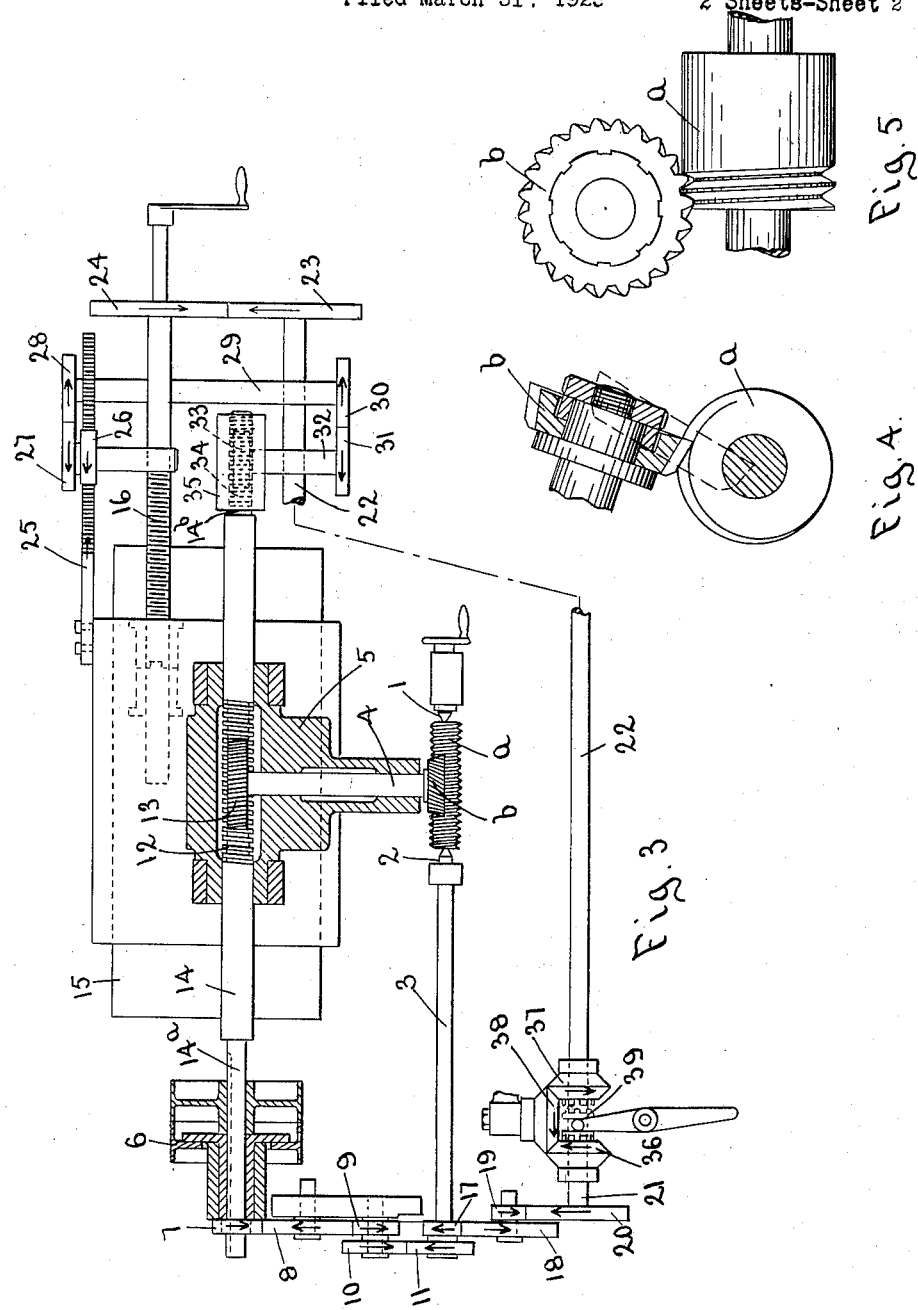
INVENTOR
Edward W. Miller Patented Oct. 27, 1925.

1,558,704

UNITED STATES PATENT OFFICE.

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT.

CUTTER FOR GENERATING THREADS AND THE LIKE.

Application filed March 31, 1923. Serial No. 629,124.

*To all whom it may concern:*

Be it known that I, EDWARD W. MILLER, a citizen of the United States, residing at Springfield, in the county of Windsor and State of Vermont, have invented new and useful Improvements in Cutters for Generating Threads and the like, of which the following is a specification.

The present invention has reference to the art of cutting threads in screws, worms, hobs, taps and the like, by a combined generating and cutting action, and also of similarly cutting encircling ribs or grooves, whether helical or not, in cylindrical articles. In the practice of that phase of the art to which this invention relates, and an embodiment of which is shown in prior Letters Patent of the United States No. 1,461,219, granted to the Fellows Gear Shaper Company July 10, 1923, upon my application, and, entitled "Machine for generating and cutting threads and the like," the thread, or an equivalent series of grooves and ribs in the work, is cut by a rotating cutter having peripheral teeth conjugate to the profile of the ribs in the work piece, in the same manner that a gear wheel is conjugate to a rack with which it is designed to mesh. Such cutter is caused to roll along the work at the same time that the latter is rotated or turned; and when the ribs cut are helical, the teeth of the cutter are given an inclined or helical form and there is impressed on the cutter, in addition to its rolling rotation, an additional rotation, in the same or the opposite direction, corresponding to the lead of the thread in the work and the rate at which the latter is being turned.

Except for the component of circular motion given to the cutter to compensate for the helical pitch of the rotating work, the relative rolling and translative movement occurring between the cutter and the work piece is exactly like that of a gear rolling in mesh with a conjugate rack, whether the rack is moved endwise while the gear turns about a stationary pivot, or the rack remains stationary while the gear is both rotated and moved translatively.

Heretofore machines and cutters used for this purpose have been, respectively, so constructed, formed and operated that the effect of the rolling movement between the cutter and the work piece is equivalent to that of a rack and pinion traveling on pitch lines approximately midway between the root and the top of the thread. This has been the universal practice, I believe, and it gives rise to several difficulties, including the following: The points of the cutter teeth are substantially narrower than the lands at the bottom of the thread. Such cutters designed for generating United States standard threads then are so very narrow at the point that they are too delicate to do the work, and besides are difficult to produce on account of the danger of the points being burned in the course of hardening. A cutter tooth rolling on a pitch line at the location indicated leaves fillets between the bottom lands and the sides of the thread. The presence of fillets on these parts, in the case of a screw adapted to receive a nut, is an obstruction to the movements of the nut; while in the case of a tap made by the generative process, it causes an error which is reproduced in all of the different threads cut with the tap.

My present object is to overcome the difficulties and remedy the inaccuracies above noted which are inherent in the generative method of screw cutting as previously practiced. I have accomplished this object by building the machine so that the relative rolling motion between the cutter and the work is equivalent to that of a gear rolling on, or approximately on, the extremities of its teeth along a pitch line at or close to the root of the thread; and by forming the teeth of the cutter conjugate to a rack having the same profile as the thread and a pitch line so located; the pitch line of the cutter being then at or near the extremities of its teeth.

Before proceeding to a fuller description of the invention in connection with the drawings furnished herewith, I may state that the profile of any screw thread, whether that of a continuous screw of any sort, or a worm, or an interrupted thread like that of a hob, tap, etc., corresponds in profile to a rack and may be considered as a rack for the purpose of the explanation given in this specification. When the faces of the thread are straight lines in profile, the rack is of that form which serves as the basis of the involute system of gearing. Practically all threaded articles of the sort above indicated have that form. The same is true also of articles called circular racks, that is cylindrical bodies having non-helical encircling ribs and grooves. Such so-called circular racks are analogous to screws for the purpose of this specification in that they have such ribs and grooves and may be considered as screws of zero pitch angle.

The cutters used in this generative process have the outlines on their cutting edges of gears or pinions conjugate to the racks which correspond to the respective thread profiles, and their peripheral projections correspond to gear teeth in shape and relation to one another. Otherwise the cutters are formed with sufficient body to give strength to their teeth, and the faces of the teeth back from their cutting edges are backed off sufficiently to give cutting clearance in accordance with well understood machine tool practice. Still further the cutter teeth are given a helix angle corresponding to that of the work and varying from zero to the maximum possible helix angle of a thread.

Referring now to the drawings which I have furnished to illustrate the principles of the invention,—

Figure 1 is a fragmentary view showing part of a thread in profile and a fragment of a cutter made in accordance with the present invention to cut threads of that profile, such figure being on a much enlarged scale.

Figure 2 is a view on the same scale of the form of cutter heretofore used for cutting the same thread; this figure being given to illustrate by comparison the characteristics novel with the present invention.

Figure 3 is a diagram of the essential mechanism of the machine organized to generate threads by means of a cutter embodying the invention.

Figures 4 and 5 are views illustrating a complete cutter in operation on the work piece, Figure 4 showing the cutter in axial section and Figure 5 showing it in face view.

Like reference characters designate the same parts wherever they occur in all the figures.

In the following description I have generally referred to the machine, the operation, and the work performed as, respectively, a thread generating machine, the operation of cutting threads, and a screw, intending to include within those terms all other articles like or analogous to screws mentioned in the introductory part of this specification. The term "screw" is thus defined in order to make it clear that the utility of the invention is not limited to the specific character of the work piece operated upon, whether the same is a machine screw, a lead screw, a worm, a hob, a tap, or any other specific article of similar nature.

Before describing the particular improvement in which the present invention consists I will briefly explain the nature of the thread-generating machine to which the invention relates and the manner of its operation, reference being directed to Figures 3, 4 and 5 of the drawing. The work piece is shown at $a$ and the cutter at $b$ in these figures; the former being a screw of any character within the foregoing definition, and the latter having a series of teeth adapted and arranged to cut grooves in the work piece in consequence of rotation of the latter about its axis.

The work piece is supported between centers 1 and 2 and is connected with a live spindle or work spindle 3. The cutter is mounted on a cutter spindle 4 which turns in suitable bearings in a carriage 5, and its relation to the work piece is substantially as shown best in Figure 4. Rotation of the work spindle for turning the work piece is effected from a belt pulley 6 through a gear 7 fast to the pulley, an intermediate gear 8, connected gears 9 and 10 and a gear 11 fixed to the work spindle. At the same time the cutter is rotated about its own axis, in accord with the pitch of the screw, by means of a worm 12, which passes through the carriage 5, and a gear or worm wheel 13 on the cutter spindle, which meshes with the worm 12. Said worm is formed on a shaft 14, of which one end $14^a$ passes through the hub of pulley 6 and is splined thereto. The rotation of the cutter by means of the worm and wheel gearing 12, 13 alone, disregarding the feed movement of the carriage, corresponds to that of the worm wheel in mesh with a worm exemplified by the work piece, and the turning speed of the latter is determined by the value of the gear train 7 to 11 according to the number of teeth and rotational speed of the cutter to cause cutting of a thread of any predetermined pitch. The gears 10 and 11 of this train are changeable gears to enable threads of various pitches to be cut by various cutters, through the selection of a gear couple of the proper ratio.

Feeding movement of the cutter along the work piece is given by advancing the carriage 5 over a bed 15. Travel of the carriage is effected by a lead screw 16 which is driven from an extension of the gear train which drives the work spindle, such extended train consisting of a gear 17 on the spindle, an intermeshing gear 18 connected to a pinion 19, a gear 20 in mesh with the pinion 19, a shaft 21 secured to gear 20, a shaft 22 driven from shaft 21, and a pair of change gears 23 and 24 on the shaft 22 and lead screw 16, respectively. The shaft 22 is here shown as broken away and its two ends out of line with one another because Figure 3 is a diagram in which, for convenience of illustration, the entire gear train is shown as resolved into the same plane.

A rotational movement as well as a translative movement is given to the cutter by means of the worm wheel 13 rolling along the worm 12, which then acts as a rack. This rolling movement is compounded with the rotational movement given to the cutter through rotation of the worm 12. But disregarding the latter component of rotation, and assuming that the worm is held stationary while the carriage travels, then the cutter rolls at the same rate as the worm wheel 13.

Good construction and satisfactory operation of the machine practically forbid changing and substitutions of worm wheels 13 of different diameters and pitches when cutters of different diameters and pitches are substituted for one another, wherefore it is usually the case that the cutter differs from the worm wheel in these particulars. Hence its rolling component of movement, due to rolling of the worm wheel on the worm 12, is different from what is required for rolling mesh with a conjugate rack. Therefore, to compensate for this difference, the worm is given an endwise movement through a gear train actuated by a rack 25 which is fastened to the carriage and moves endwise with it. The rack 25 drives a pinion 26 connected to one of a pair of change gears 27 and 28, the latter of which is mounted on a shaft 29 carrying a change gear 30 in mesh with a conjugate change gear 31 on a shaft 32. The shaft 32 carries a gear 33 meshing with a rack 34 which is formed on a sleeve 35 surrounding the extremity 14$^b$ of the worm shaft 14, in which the latter has a rotative bearing. Thus, when the carriage is moved in either direction, the worm shaft is shifted endwise at a rate which compensates for the difference in pitch diameters of the worm wheel 13 and the cutter $b$, whereby the rolling movement of the latter is made exactly equal to that which would correspond to rolling of the cutter in mesh with a stationary conjugate rack.

A reversing gear for driving the shaft 22 in either direction consists of a bevel gear 36 fast on shaft 21 and a bevel gear 37 loose on shaft 22, an intermediate bevel gear 38, and a clutch 39 splined to the shaft 22 and shiftable into connection with either gear 36 or 37 and out of connection with the other of said gears.

The movements due to rotation and endwise movement of the worm and to the travel of the carriage are compounded in the cutter, causing the latter to be fed along the work and to cut a thread of desired pitch in one traverse.

A machine in which the principles above explained are embodied is shown in the aforesaid Letters Patent No. 1,461,219, to which attention is directed for explanation of a suitable operative construction and arrangement of the several parts.

Heretofore such machines have been constructed to cause the rolling component of motion given to the cutter to correspond to that of rolling on a pitch line approximately midway between the root and top of the thread in the work. This condition is illustrated in Figure 2 where fragments of a work piece $a$ and cutter $b'$ are shown. This figure shows the profile of two adjacent turns 40, 40 and three intermediate depressions 41 of the thread. It also shows three teeth 42 of the cutter. The faces of the thread in profile are straight lines, thus corresponding to the form of rack which is the basis of the involute system of gearing. Hence the profile of the thread shown in this figure may be considered, for the purpose of explaining the theory of the cutter, as an involute rack.

The pitch line of the work is shown at 43—44 and that of the cutter at 45—46, the former being approximately midway between the root and top of the thread and the latter being tangent to the former. This condition means that as the cutter is fed along the work, its rate of rolling rotation, disregarding the component of rotation which conforms to the rate of rotation and helix angle of the work, is the same as that of a disk having a circumference on the line 45—46 rolling without slip on the line 43—44. It will be noted that the lands 47 at the points of the cutter teeth are substantially narrower than the lands 48 at the bottoms of the spaces 41, and that fillets 49 are formed between the lands 48 and the root of the thread in the work. In the case of United States standard screw-threads the bottom lands are relatively narrow in proportion to the pitch of the thread, and in the case of small screws, taps, etc., the actual dimensions of these lands are very small.

The drawing here shows such a thread on a greatly enlarged scale, but the actual values may be as small as a few thousandths of an inch. Cutters having such narrow points are so delicate that there is great danger of their being broken, and they are also difficult to make on account of the liability of their points being burned in the course of hardening. The fillets 49 likewise are objectionable, since they obstruct more or less the spaces designed to receive the top lands of the threads in the mating piece.

I have discovered that by changing the form and rate of rotation of the cutter in such manner that its rolling component of motion is caused to take place on a pitch circle approximately coincident with the extremities of its teeth and tangent to a pitch line on the work approximately at the root of the thread, the above mentioned objections are avoided.

The characteristics of involute curves make possible the design of gear forms which will mesh together when rolled on any pitch lines within the limits where interference will occur or where the teeth must be cut away from the correct mathematical forms to prevent interference. Accordingly, in applying the present invention, I have provided the cutter teeth with outlines at their cutting edges which are involute curves of the proper form and location to roll in proper mesh with a rack, conforming to the profile of the thread to be cut, when the pitch line of the rack and the pitch circle of the cutter have the relation just above defined.

Figure 1 shows a fragment of a cutter $b$ embodying this improvement and having teeth 50, 50. A fragment of the work piece $a$ is also shown which is similar to that shown in Figure 2 except that it has no fillets like those at the locations 49 in Figure 2. In Figure 1 the line 51—52 represents the pitch line of the work located at the root of the thread and corresponds to the pitch line of a rack having the same profile as the thread, and 53—54 represents the pitch line of the cutter; 55—56 represents the base line of such cutter with reference to which the involute curves of its cutting edges, and of the faces back from such edges, are generated. This cutter has a substantially different form and outline of tooth than that shown in Figure 2, and although the teeth are narrower in the body, they are proportionally much wider at the point, having lands 57 there which are as wide as the bottom lands 48 of the thread. A machine using the cutter $b$ shown in Figure 1 is geared, by the selection of suitable change gears 27, 28 and 30, 31, so that the rolling component of the cutter takes place on the pitch line 53—54, whereby the cutter, in effect, rolls on the points of its teeth and at the bottom of the thread. Then the points of the cutter teeth, being as wide as the bottom lands of the thread, cut out the lands to the full width without any fillets at the bases of the adjacent turns of the thread.

A cutter so made and operated is not only stronger in the weakest parts than cutters as previously made and operated, but it produces better work.

A part of my invention, and the protection which I claim herein, applies as well to all gear shaped cutters adapted to generate threads and having cutting edges, and faces back from such edges, which are involute curves conforming to a pitch circle which coincides, or approximately coincides, with the outer extremities of the cutter teeth; and are otherwise appropriately made for generating a thread of any desired pitch, depth, face angle, and helix angle.

What I claim and desire to secure by Letters Patent is:

1. In a thread generating machine, a cutter having its cutting edges of an outline similar to the teeth of a spur gear and adapted to generate threads by rolling movement relative to the work, such cutter being formed to roll on a pitch circle approximately coincident with the points of its teeth and on a pitch line in the work approximately coincident with the root of the thread to be cut therein.

2. In a thread cutting machine, a cutter having cutting edges arranged similarly to the tooth outlines of a spur gear of the involute system, formed conjugate to a rack of the same profile as the thread to be cut and with a pitch circle approximately at the points of its teeth, and means for giving to the cutter a component of rolling movement relative to a work piece, corresponding to the movement of a gear wheel rolling on a pitch circle similarly located and tangent to a pitch line at the root of the thread being cut in the work.

3. A thread generating cutter having its cutting edges in the form of the outlines of involute gear teeth conjugate to a rack of which the pitch line is approximately at the base of its teeth.

4. A thread generating cutter having its cutting edges formed and arranged similarly to the outlines of the tooth faces of an involute spur gear conjugate to a rack similar to the profile of the thread being cut and of which the pitch line is at the root of the thread.

5. A thread generating cutter having peripheral projections similar to gear teeth with cutting edges and adjacent faces formed as involute curves generated to make correct rolling mesh with a rack when such cutter rolls on a circle coincident or approximately so with the extremities of its tooth-like projections.

6. A thread generating cutter having its cutting edge in the form of the outlines of the teeth of an involute gear wheel, the pitch line of which wheel is approximately coincident with the points of its teeth.

In testimony whereof I have affixed my signature.

EDWARD W. MILLER.